United States Patent Office 2,998,352
Patented Aug. 29, 1961

2,998,352
PRODUCTION OF TETRACYCLINES
Jerry Robert Daniel McCormick, New City, N.Y., Newell Oscar Sjolander, Saddle River, N.J., and Ursula Hirsch, Pearl River, N.Y., assignors to American Cyanamid Company, New York, N.Y., a corporation of Maine
No Drawing. Filed Apr. 13, 1959, Ser. No. 805,733
10 Claims. (Cl. 195—80)

This invention relates to the production of tetracyclines by fermentation and more particularly is concerned with a novel process for the cosynthetic production of an antibiotic of the tetracycline series, e.g., tetracycline, chlortetracycline, bromotetracycline, oxytetracycline, 6-demethyltetracycline, 7-chloro-6-demethyltetracycline, etc. by a mixed fermentation involving two or more microorganisms of the genus Streptomyces.

It is known, of course, to produce the tetracycline antibiotics by means of single pure strain fermentations. In fact, this is the ordinary manner of producing these antibiotics. See for example, United States patent to Duggar No. 2,482,055 for the production of chlortetracycline by S. aureofaciens; United States patent to Sobin No. 2,516,080 for the production of oxytetracycline by S. rimosus; United States patent to Minieri et al., No. 2,734,018 for the production of tetracycline by S. aureofaciens; and United States patent to McCormick et al., No. 2,878,289 for the production of 6-demethyltetracycline and 7-chloro-6-demethyltetracycline by S. aureofaciens. Pure single strain fermentations have previously been universally used for the production of these antibiotics even though the maintenance of these pure strains is accomplished only at great efforts.

In accordance with the present invention it has been discovered that it is possible to produce commercially significant quantities of the tetracycline antibiotics by means of a synergistic fermentation with two or more microorganisms of the genus Streptomyces.

It is a surprising feature of the present invention to discover that it is possible to use a mixture of two or more selected strains of microorganisms of the genus Streptomyces and obtain in many instances a tremendous enhancement or synergistic effect in the production of the tetracyclines even when such strains fermented singly produce none or relatively small amounts of the tetracycline antibiotics. This phenomenon is referred to herein as cosynthesis. It is also surprising to discover that both members of the cosynthesizing pair of microorganisms need not be of the same species and indeed only one member of the pair need be derived from a normally-tetracyclines-producing species of the genus Streptomyces. Thus, some strains of S. aureofaciens will demonstrate cosynthetic production of the tetracyclines with strains of the species S. albo-niger, S. albus, S. griseus, etc. Similarly, cosynthetic activity can be accomplished using the oxytetracycline-producing species S. rimosus together with a non-tetracycline producing species such as S. lavendulae or S. griseus.

The selection of strains for the purpose of accomplishing the cosynthesis of the tetracyclines is easily carried out by the classical means of strain selection as practiced in the art. One usual method consists of inoculating a Petri plate containing a nutrient agar with spores of a stock culture after having treated the spores with a mutagenic agent. After incubation of the seeded plate, inspection of the colonies formed shows that certain colonies differ in an obvious manner from the parent culture under similar circumstances. Typical changes from the parent might be, for example, dark brown colonies compared to normal brown-yellow colonies; micro-colonies compared to normal; giant colonies compared to normal; pale-yellow colonies; colorless colonies, dark green colonies; copper-red colonies compared to normal brown-yellow colonies; rough or smooth colonies compared to normal fissured colonies; colonies with no diffusible pigment compared to normal colonies having brown-yellow diffusible pigment; colonies with fluorescent diffusion halos compared to no fluorescent halo, and combinations of these and numberless others. Even when no apparent colony differentiation appears, variation can frequently be shown by further inspection of arbitrarily selected isolates, such as by inspection of antibiotic production in pure-culture shaker-flask fermentation, by examination for types of carbohydrates utilized, by spectrophotometric, spectrofluorometric, paper chromatographic examination or by any other means of physical, chemical or biological inspection that may be at hand. All of these are standard means of selecting microbial variants and are well known to persons skilled in the art.

Mutagenic agents which are useful in producing variants are radiation (X-ray; ultraviolet; $\alpha$-, $\beta$-, or $\gamma$-ray; infrared; micro-wave; cosmic; sonic) reactive chemicals (nitrogen mustards, sulfur mustards, cobalt ion, colchicine, polynuclear hydrocarbons, etc.) and physical manipulation (grinding). Ultra-violet, X-ray, and nitrogen mustard have been of particular usefulness as mutagenic agents.

Having selected a group of variants, the next step in establishing a cosynthetic fermentation is to determine which ones of these variants have the ability to cooperate biologically. This can be done purely by trial and error, that is, by conducting fermentations inoculated with pairs, triads, or higher combinations of the selected strains and comparing the quantity and kinds of tetracyclines produced with those produced by the component variants when used in separate fermentations. However, since cosynthetic variants occur only infrequently, since there are many cosynthetic types, and since many types are quite specific in their biological cooperation with only certain other cosynthetic types, this trial and error approach can be laborious. It is preferable, therefore, to have a member of a cosynthetic pair which is known to function as such so as to serve as a test organism in searching for new cosynthesizing variants. By this means, the number of combinations to be tested is reduced from a very large number for each variant to only one test for each variant; the test consisting of carrying out a mixed fermentation with each new variant plus the one known cosynthesizing variant. In this situation, the discovery of a new cosynthesizing variant is marked by a significant increase in the production of tetracyclines in the mixed fermentation as compared to the single fermentations using the components being tested.

Many such cultures which have been found to be capable of acting cosynthetically both among themselves and with other variants are already on deposit in variour repositories such as the Northern Regional Research Laboratory, Peoria, Illinois and the American Type Culture Collection, Washington, D. C. In particular, we have discovered two new variants of S. aureofaciens which have characteristic biochemical and biosynthetic properties which exemplify the strains of S. aureofaciens that are useful in carrying out the present invention. In addition, we have discovered many other varians of S. aureofaciens which can be used in the present invention.

These strains are members of the species S. aureofaciens since they are direct descendants of the chlortetracycline-producing soil isolate *S. aureofaciens* A377 described in the United States Patent to Duggar No. 2,482,055, the culture of which is deposited at the Northern Regional Research Laboratory, Peoria, Illinois as NRRL 2209. Mutagenic agents and selective agents used in obtaining these strains include ultraviolet irradiation, nicotine, nitrogen mustard treatments, and phage exposure.

These strains posses the same general characteristics as do the strains which produce the tetracyclines and differ in the same general manner that the teracycline-producing and chlortetracycline-producing strains of *S. aureofaciens* differ from each other, as has been described in a number of scientific papers which have been published.

The data appearing below will serve to illustrate the characteristics of two of these new strains, T–219 and E–504, as compared to the original A377 strain available as NRRL 2209.

*Streptomyces aureofaciens* strains T–219 and E–504 were differentiated from *Streptomyces aureofaciens* strain A377 (NRRL 2209) by observation of growth characteristics on various media incubated at 26.5° C.

1. GLYCEROL ASPARAGINE BEEF EXTRACT AGAR

| | |
|---|---|
| Glycerol_____grams__ | 10 |
| L-Asparagine_____do____ | 0.5 |
| Beef Extract_____do____ | 2 |
| $KH_2PO_4$_____do____ | 0.5 |
| Bacto agar_____do____ | 15 |
| Distilled water, q.s._____milliliters__ | 1,000 |
| Adjustment with 50% KOH to pH_____ | 7.0 |
| Post sterilization pH_____ | 7.2 |

| | *Streptomyces aureofaciens* | | |
|---|---|---|---|
| | Strain T-219 | Strain E-504 | Strain A-377 |
| Growth | Good to abundant, deep brown [1] to dark brown.[1] | Good, dark luggage tan [1] to oak brown.[1] | Good. |
| Aerial hyphae | Sparse, becoming abundant, white. | Trace, white. | Slight to fair, white to light gray. |
| Sporulation | Sparse, becoming abundant at growth margins, gray. | None. | Light gray. |
| Diffusible pigment | Light yellow-green to deep amber. | Light amber. | Light yellow. |
| Reverse | Deep brown [1] to dark brown.[1] | Dark luggage tan [1] to oak brown [1]. | Yellow [1] to light orange-yellow. |

[1] Color Harmony Manual, third edition, Container Corp. of America.

2. DEXTRIN CZAPEK-DOX AGAR

| | |
|---|---|
| Dextrin_____grams__ | 10 |
| $NaNO_3$_____do____ | 2 |
| $K_2HPO_4$_____do____ | 1 |
| $MgSO_4.7H_2O$_____do____ | 0.5 |
| KCl_____do____ | 0.5 |
| $FeSO_4.7H_2O$_____do____ | 0.01 |
| Bacto agar_____do____ | 15 |
| Distilled water, q.s._____milliliters__ | 1,000 |
| Post sterilization pH_____ | 7.2 |

| | *Streptomyces aureofaciens* | | |
|---|---|---|---|
| | Strain T-219 | Strain E-504 | Strain A-377 |
| Growth | Thin, entire hyaline, white. | Fair, hyaline to translucent white. | Good. |
| Aerial hyphae | None. | Sparse, white. | Abundant, mouse gray [1] to lead gray,[1] water-white surface globules. |
| Sporulation | ___do___ | None. | Profuse. |
| Diffusible pigment | ___do___ | ___do___ | Trace: pale yellow. |
| Reverse | Diaphanous colorless. | Hyaline to translucent white. | Apigmentous, pink trace. |

[1] Color Harmony Manual, third edition, Container Corp. of America.

3. AP4 CORN STEEP AGAR

| | |
|---|---|
| Corn steep_____grams__ | 4 |
| Sucrose_____do____ | 10 |
| $MgSO_4.7H_2O$_____do____ | 0.25 |
| $KH_2PO_4$_____do____ | 2 |
| $(NH_4)_2HPO_4$_____do____ | 2 |
| Bacto agar_____do____ | 20 |
| Tap water, q.s._____milliliters__ | 1,000 |
| Post sterilization pH_____ | 6.5 |

| | *Streptomyces aureofaciens* | | |
|---|---|---|---|
| | Strain T-219 | Strain E-504 | Strain A-377 |
| Growth | Abundant, deep brown [1] to dark brown.[1] | Excellent, deep brown [1] to dark brown.[1] | Excellent. |
| Aerial hyphae | Sparse. | Abundant, white. | Abundant, fawn.[1] |
| Sporulation | Sparse, light gray. | Abundant, fawn [1] to beaver.[1] | Profuse, fawn.[1] |
| Soluble pigment | Olive-yellow to deep amber. | Orange to brown. | Light yellow to amber. |
| Reverse | Deep brown [1] to dark brown.[1] | Light brown [1] to chocolate brown [1]. | Light tan.[1] |

[1] Color Harmony Manual, third edition, Container Corp. of America.

4. OTHER MEDIA

| Medium | *Streptomyces aureofaciens* | | |
|---|---|---|---|
| | Strain T-219 | Strain E-504 | Strain A-377 |
| Nutrient agar | Fair growth: biscuit.[1] No aerial hyphae. No soluble pigment. Reverse: biscuit.[1] | Poor to fair growth. No aerial hyphae. No soluble pigment. Reverse: beige.[1] | Good growth. No aerial hyphae. Pale yellow soluble pigment. Reverse: pale yellow. |
| Glusoce asparagine meat extract agar. | Good growth: deep brown [1] to chocolate brown.[1] Abundant to profuse aerial hyphae: white becoming light fawn.[1] Sporulation: abundant to profuse. Deep brown [1] soluble pigment. Reverse: deep brown [1] to chocolate brown.[1] | Good growth: camel [1] to dark brown mahogany.[1] Aerial hyphae moderate to abundant white becoming pussy-willow gray [1] to ashes. Sporulation: moderate to abundant. Light yellow soluble pigment. Reverse: camel [1] to dark brown mahogany.[1] | Good growth. Aerial hyphae white becoming increasingly gray with increase in spore formation. Trace: yellow-orange soluble pigment. Reverse: light yellow to pink-orange. |

See footnotes at end of table.

4. OTHER MEDIA—Continued

| Medium | Streptomyces aureofaciens | | |
|---|---|---|---|
| | Strain T-219 | Strain E-504 | Strain A-377 |
| Waksman's agar | Abundant growth: deep brown[1] to chocolate brown.[1] Very profuse aerial hyphae: white becoming beige brown.[1] Very profuse sporulation. Yellow-green to amber soluble pigment. Reverse: deep brown[1] to chocolate brown.[1] | Excellent growth: dark brown mahogany.[1] Profuse aerial hyphae: white becoming beaver[1] to chocolate.[1] Profuse sporulation. Orange-brown soluble pigment. Reverse: dark brown mahogany.[1] | Good growth. Aerial hyphae fair becoming abundant: white to taupe brown.[1] Light yellow soluble pigment. Reverse: Camel[1] to adobe brown.[1] |
| Potato slants | Excellent, moist, smooth, nodulated growth becoming finely crenulated: olive. Abundant white aerial hyphae. Sporulation: none but commencing. Saddle tan[1] soluble pigment. | Profuse, moist, smooth, nodulated growth: dark brown mahogany.[1] Aerial hyphae: none to abundant white becoming light fawn[1] to fawn[1] with sporulation. Rose taupe[1] to dark brown mahogany[1] soluble pigment. | Profuse, moist, smooth, nodulated growth: light brown yellow[1] to beige[1] to cedar.[1] No soluble pigment. |
| Purple milk | Heavy hyaline growth collar: mustard brown.[1] Light brown[1] soluble pigment. Slight alkaline reaction but no apparent peptonization. | Definite growth collar: deep red brown[1] to brown mahogany.[1] No apparent peptonization. No pH change but false alkaline color reaction due to diffusion of soluble pigment. | Slight white to pale yellow growth collar. Little significant pH change or apparent peptonization in 14 days. |
| AP6 corn-steep agar[2] | Abundant growth: brown[1] to chocolate brown.[1] Sparse aerial hyphae, white becoming light gray at foci. Sparse sporulation. Deep amber soluble pigment. Reverse: hyaline, deep brown[1] to chocolate brown.[1] | Excellent growth: light spice brown[1] to chocolate brown.[1] Abundant aerial hyphae: white becoming fawn[1] to beaver.[1] Abundant sporulation. Deep orange-brown soluble pigment. Reverse: light spice brown[1] to chocolate brown.[1] | Excellent growth. Profuse aerial hyphae. Profuse sporulation: fawn.[1] Light amber soluble pigment. Reverse: tan.[1] |
| Q4 agar[3] | Abundant growth: deep brown[1] to chocolate brown.[1] Aerial hyphae: sparse, white to light gray to light tan.[1] Poor sporulation. Very deep amber soluble pigment. Reverse: deep brown[1] to chocolate brown.[1] | Excellent growth: burgundy[1] to ebony brown.[1] Profuse aerial hyphae: white to rose taupe[1] becoming taupe brown.[1] Profuse sporulation. Very deep red-orange soluble pigment. Reverse: burgandy[1] to ebony brown.[1] | Excellent growth: pale yellow. Profuse aerial hyphae: dark brown.[1] Profuse sporulation. Orange-brown soluble pigment. Reverse: orange to orange-yellow. |

[1] Color Harmony Manual, third edition, Container Corp. of America.

[2] AP6 agar:
- Sucrose _____ grams__ 10
- MgSO$_4$.7H$_2$O _____ do____ 0.25
- KH$_2$PO$_4$ _____ do____ 2
- (NH$_4$)$_3$PO$_4$ _____ do____ 2
- Corn steep _____ do____ 6
- Bacto (refined) agar _____ do____ 20
- Water, q.s. _____ milliliters__ 1,000
- Post sterilization pH _____ 6.5

[3] Q4 agar:
- Sucrose _____ grams__ 10
- MgSO$_4$.7H$_2$O _____ do____ 0.25
- KH$_2$PO$_4$ _____ do____ 4
- (NH$_4$)$_3$PO$_4$ _____ do____ 2
- Corn steep _____ do____ 9
- Crude agar _____ do____ 30
- Water, q.s. _____ milliliters__ 1,000
- Post sterilization pH _____ 6.5

5. MICROSCOPIC OBSERVATIONS

| Medium | Streptomyces aureofaciens | | | | | |
|---|---|---|---|---|---|---|
| | Strain T-219 | | Strain E-504 | | Strain A-377 | |
| | Mycelium | Spores | Mycelium | Spores | Mycelium | Spores |
| Glycerol asparagine meat extract agar. | Flexuous, continuous, branched. Diam. 0.5–1.0μ. | Spheroidal to ovoidal. Diam. 0.5–1.0μ. | Flexuous, continuous, branched. Diam. 0.7–1.0μ. | None observed. | Flexuous, continuous, branched. Diam. 1.0–1.2μ. | Spheroidal to ovoidal. Diam. 1.2–1.5μ. |
| AP4 cornsteep agar. | Flexuous, continuous, branched. Diam. 0.5–1.0μ. | Spheroidal to ovoidal. Diam. 0.5–1.0μ. | Flexuous, continuous, branched. Diam. 0.5–1.0μ. | Spheroidal to ovoidal. Diam. 0.5–1.0μ. | Flexuous, continuous, branched. Diam. 0.8–1.0μ. | Spheroidal to ovoidal. Diam 1.2–1.5μ. |
| Waksman's agar. | Flexuous, continuous, branched. Diam. 0.5–1.0μ. | Spheroidal to ovoidal. Diam. 0.5–1.0μ. | Flexuous, continuous, branched. Diam. 0.5–1.0μ. | Spheroidal to ovoidal. Diam. 0.5–1.0μ. | Flexuous, continuous, branched. Diam. 0.5–1.0μ. | Spheroidal to ovoidal. Diam. 0.5–1.0μ. |

Mycelial and spore morphology of *Streptomyces aureofaciens* strains T-219 and E-504 are apparently similar to each other and to that of the original strain A-377.

Viable cultures of *S. aureofaciens* strains E-504 and T-219, which are useful in the described cosynthesis of the tetracyclines in accordance with the present invention, have been deposited with the American Type Culture Collection in Washington, D.C. where these strains have been assigned ATCC accession numbers 13,191 and 13,192, respectively. In addition, the *S. aureofaciens* strains described in copending applications Serial Nos. 743,424 and 743,483, filed June 20, 1958, and on deposit in the American Type Culture Collection under ATCC accession numbers 13,189 and 13,190 may also be used for the cosynthesis of the tetracyclines in accordance with the present invention.

In addition to the strains of *S. aureofaciens* mentioned above, and deposited at the American Type Culture Collection, we have found that many other strains of *S. aureofaciens* and of all other known tetracyclines-producing species of the genus Streptomyces such as *S. hygroscopicus*, *S. platensis*, *S. rimosus* and *S. viridifaciens* as well as properly selected mutants from each of these strains can be used in the cosynthesis of the tetracyclines as herein described.

Many strains of the genus Streptomyces are capable of the cosynthesis of the tetracyclines provided they are grown under the proper conditions, and mixed in the right combinations with one or more companion strains selected as described hereinbefore. Strains of Streptomyces obtained from culture collections or isolated from the soil or mutants derived therefrom by procedures well known to the art are grown under conditions normally used for cultivating Streptomcyes for the production of antibiotics or other products. The nutrient media contain suitable carbon and nitrogen sources, essential minerals and growth factors, and are formulated with ingredients such as sucrose, starch, animal or vegetable fats, corn steep liquor, soybean meal, cottonseed meal, yeast, and various salts. The cultures are grown at temperatures of 20°–35° C., under aerated conditions as normally obtained in shaker flasks or aerated in agitated tanks fermentors. The cultures are mixed, in combinations of two or more at a time, at the beginning of the fermentation period or at some time during fermentation. The final fermentation mashes are assayed for tetracyclines by the usual methods. Cosynthesis of tetracyclines is demonstrated in those combinations of strains which result in enhanced production of one or more tetracyclines over controls fermented singly or mixed after the termination of the fermentaiton period. These procedures are described in more detail in the examples which follow.

The invention will be described in greater detail in conjunction with the following specific examples.

EXAMPLE 1

Preparation of inocula

An inoculum medium was prepared according to the following formula:

| | |
|---|---|
| Sucrose | grams 30.0 |
| Corn steep liquor | milliliters 16.5 |
| $(NH_4)_2SO_4$ | grams 2.0 |
| $CaCO_3$ | do 7.0 |

Water to 1000 milliliters.

Eight milliliter aliquots of this medium were placed in each of a series of eight inch test tubes and sterilized by autoclaving for 20 minutes under 15 pounds per square inch pressure. Spores of S. aureofaciens ATCC 13,191 were washed from an agar slant with sterile distilled water to form a suspension containing approximately $60 \times 10^6$ spores per milliliter. A 0.33 milliliter portion of this suspension was used to inoculate each of the tubes containing an 8 milliliter portion of the inoculum medium shown above. The inoculated shaker tube was then incubated for 24 hours at 28° C. on a reciprocating shaker operating at 116 oscillations per minute. Inoculum for all strains used in the examples which follow was prepared in a similar manner.

EXAMPLE 2

Preparation of fermentation medium

A fermentation medium was prepared according to the following formula:

| | Grams |
|---|---|
| $(NH_4)_2SO_4$ | 5.0 |
| $CaCO_3$ | 9.0 |
| $NH_4Cl$ | 1.5 |
| $MgCl_2.6H_2O$ | 2.0 |
| $FeSO_4.7H_2O$ | 0.04 |
| $MnSO_4.4H_2O$ | 0.05 |
| $CoCl_2.6H_2O$ | 0.005 |
| $ZnSO_4.7H_2O$ | 0.1 |
| Corn steep | 25.0 |
| Cottonseed meal | 2.0 |
| Corn starch | 55.0 |

Water to 1000 milliliters.

Twenty-five milliliter portions of the medium were placed in 250 milliliter Erlenmeyer flasks, and 0.5 milliliters of lard oil was added to each flask. The flasks containing the fermentation medium and lard oil were sterilized in an autoclave for 20 minutes under 15 pounds per square inch pressure.

EXAMPLE 3

Preparation of a fermentation medium having minimum halide content

A fermentation medium having a minimum halide content was prepared as follows:

| | |
|---|---|
| Resin-dehalogenated corn steep | 30 grams per liter. |
| $CaCO_3$ | 7 grams per liter. |
| $(NH_4)_2SO_4$ | 5 grams per liter. |
| Low-chloride starch | 55 grams per liter. |
| $MnSO_4.4H_2O$ | 50 milligrams per liter. |
| $H_3PO_4$ (85%) | 200 milligrams per liter. |

The medium was made up to volume with distilled water. Twenty-five milliliter portions of the medium were placed in 250 milliliter Erlenmeyer flasks, and 0.5 milliliters of lard oil was added to each flask. The flasks were plugged with cotton and autoclaved for 15 minutes at 120° C., then cooled to room temperature.

EXAMPLE 4

Cosynthesis of 7-chloro-6-demethyltetracycline in a mixed fermentation of S. aureofaciens strains ATCC 13,191 and ATC 13,189

Inocula of Streptomyces aureofaciens ATCC 13,191 and Streptomyces aureofaciens ATCC 13,189 were grown as described in Example 1. A number of 250 milliliter Erlenmeyer flasks containing 25 milliliter portions of fermentation medium were then prepared as illustrated in Example 2. Three fermentation flasks were inoculated with 1.0 milliliter aliquots of S. aureofaciens ATCC 13,191 inoculum and three other flasks with inoculum of S. aureofaciens ATCC 13,189. All inoculated fermentation flasks were incubated at 25° C. on a rotary shaker operating at 180 revolutions per minute for a period of 48 hours, at which time mixtures of 20 milliliters of fermentation mash containing S. aureofaciens ATCC 13,191 and 5 milliliters of fermentation mash containing S. aureofaciens ATCC 13,189 were prepared, utilizing one of the three flasks inoculated with a particular strain. The remaining flasks containing single strains and the flasks containing the two-strain mixtures were again incubated at 25° C. on a rotary shaker for an additional 72 hour period, making a total incubation time of 120 hours in all cases. The flasks containing single-strain 120 hour harvest mashes and the flasks containing two-strain 120 hour harvest mashes were tested for antibiotic potency by means of a bioassay technique (turbidimetric, with Staphylococcus aureus) with the following results:

| Microorganisms | 7-chloro-6-demethyltetracycline by bioassay, mcg./ml. |
|---|---|
| ATCC 13,191 at age 120 hours | <0.5 |
| ATCC 13,189 at age 120 hours | <3 |
| ATCC 13,191 plus ATCC 13,189 mixed at 48 hours, assayed at 120 hours | 205 |

EXAMPLE 5

Cosynthesis of chlortetracycline in a mixed fermentation of S. aureofaciens ATCC 13,191 and S. aureofaciens ATCC 13,192

An AP6 agar plate was seeded thinly with S. aureofaciens spores which had been subjected to nitrogen-mustard mutagenic agent. After the usual incubation at 27° C. for three days, an unusual colony was observed.

It was characterized by a distinctly fluorescent, yellow-green, diffusible pigment and a colony color which was more nearly mustard color than the parent strain. This colony, was removed, transferred to a Q4 agar slant and incubated at 27° C. for two weeks to produce spores. These spores were used in the preparation of an ATCC 13,192 inoculum; following the directions given in Example 1. This inoculum, in turn, was used in the usual manner to prepare 24-hour mash for cosynthesis testing. This was carried out as in the preceding Example 4, except that ATCC 13,192 was substituted for S. aureofaciens ATCC 13,189 and the proportion of ATCC 13,192 and S. aureofaciens ATCC 13,191 in the mixture was 50:50 instead of 80:20 as in Example 4. The following results were obtained:

| Microorganisms | Chlortetracycline content by bioassay, mcg./ml. |
|---|---|
| ATCC 13,191 at age 120 hours | 0 |
| ATCC 13,192 at age 120 hours | 0 |
| ATCC 13,191 plus ATCC 13,192 mixed at 24 hours, assayed at 120 hours | 110 |

EXAMPLE 6

*Cosynthesis of chlortetracycline in a mixed fermentation of S. aureofaciens ATCC 13,192 and S. aureofaciens S-2242*

A dark brick-red non-antibiotic producing colony was selected as an unusual colony type from an AP6 agar plate seeded with normal S. aureofaciens spores. This colony was transferred to a Q4 agar slant and incubated at 27° C. for 17 days to produce spores. The resulting strain, designated S-2242, was tested for cosynthetic activity with ATCC 13,192 of the preceding Example 5, using the technique outlined in Example 5. In addition, tests were made on a sample composed of a 50:50 mixture of the 120-hour mature mashes of the single fermentations of both microorganisms. The following results were obtained:

| Microorganisms | Chlortetracycline content by bioassay, mcg./ml. |
|---|---|
| ATCC 13,192 at age 120 hours | 0 |
| S-2242 at age 120 hours | 20 |
| ATCC 13,192 plus S-2242 mixed at 24 hours, assayed at 120 hours | 740 |
| ATCC 13,192 plus S-2242 mixed and assayed at 120 hours | 20 |

EXAMPLE 7

*Cosynthesis of chlortetracycline in a mixed fermentation of S. aureofaciens S-2242 and S. aureofaciens S-2895*

S-2895 was derived from a nitrogen-mustard treated S. aureofaciens spore suspension This isolate was selected from an AP4 agar plate (which had been seeded with nitrogen-mustard treated spores of S. aureofaciens) as a large, flat, bright orange-brown colony. The colony was transferred to a Q4 agar slant. After incubation at 27.5° C. for two days, a characteristic yellow-green fluorescence could be seen in this slant, and it was observed that the fluorescent material had diffused into the agar. Fermentation with the spores of this isolate resulted in a greenish-brown mash which exhibited a bright fluorescence in ordinary daylight. The mash contained no antibiotic activity. A mixed fermentation, utilizing S-2242 from Example 6 and S-2895 clearly exhibited cosynthesis, when carried out according to the method shown in Example 5, as is illustrated by the following test results:

| Microorganisms | Chlortetracycline content by bioassay, mcg./ml. |
|---|---|
| S-2242 at age 120 hours | 33 |
| S-2895 at age 120 hours | 3 |
| S-2242 plus S-2895 mixed at 24 hours, assayed at 120 hours | 424 |

EXAMPLE 8

*Cosynthesis of chlortetracycline in a mixed fermentation of S. aureofaciens S-2895 and S. aureofaciens ATCC 12,750*

Inocula of S. aureofaciens S-2895 derived as shown in Example 7 and S. aureofaciens ATCC 12,750 were grown as directed in Example 1. A number of 250 milliliter Erlenmeyer flasks containing 25 milliliter portions of fermentation medium were then prepared as described in Example 2. Three of these fermentation flasks were inoculated with 1.0 milliliter aliquots of S-2895 and three other flasks with inoculum of S. aureofaciens ATCC 12,750. All inoculated fermentation flasks were incubated at 25° C. on a rotary shaker operating at 180 revolutions per minute for a period of 24 hours. The 24 hour culture of S-2895 was then mixed 50:50 with the 24 hour culture of S. aureofaciens ATCC 12,750. The remaining flasks containing single strains as well as the flasks containing the two-strain mixtures were again incubated at 25° C. on a rotary shaker for an additional 96 hours, making a total incubation time of 120 hours in all cases.

The flasks containing single-strain 120 hour mature mashes and the flasks containing two-strain 120 hour mature mashes were assayed with the following results:

| Microorganisms | Chlortetracycline content by bioassay, mcg./ml. |
|---|---|
| S-2895 at age 120 hours | 3 |
| ATCC 12,750 at age 120 hours | 331 |
| S-2895 plus ATCC 12,750 mixed at 24 hours, assayed at 120 hours | 3,860 |

EXAMPLE 9

*Cosynthesis of chlortetracycline in a mixed fermentation of S. aureofaciens S-2895 and S. aureofaciens E-475*

Material from a mature mash of S. aureofaciens was streaked out on AP6 agar by the dilution streak method and incubated at 27.5° C. A colony which appeared larger and paler in color than those typical of the parent strain was selected, isolated, and spread on an agar slant. After sporulation this isolate E-475 was used in a fermentation. The resulting mash was dark red-brown and contained no chlortetracycline. When mixed in fermentation with S-2895, obtained as shown in Example 7, chlortetracycline was cosynthesized as indicated by an increase in antibiotic activity against *Staphylococcus aureus* corresponding to 830 micrograms of chlortetracycline per milliliter of 120-hour mature mash.

EXAMPLE 10

*Cosynthesis of chlortetracycline in a mixed fermentation of S. aureofaciens S-2895 and S. viridifaciens ATCC 11,989*

A mixed fermentation of S-2895, obtained as shown in Example 7, and S. viridifaciens ATCC 11,989 was carried out as described in Example 8. In addition, tests were made on a sample composed o a 50:50 mixture of the 120-hour mature mashes of the single fermentations of both microorganisms with the following results:

| Microorganisms | Chlortetracycline content by fluorometric assay, mcg./ml. |
| --- | --- |
| S-2895 at age 120 hours | 0 |
| ATCC 11,989 at age 120 hours | 180 |
| S-2895 plus ATCC 11,989, mixed at 24 hours, assayed at 120 hours | 310 |
| S-2895 plus ATCC 11,989, mixed and assayed at 120 hours | 80 |

EXAMPLE 11

*Cosynthesis of chlortetracycline in a mixed fermentation of S. aureofaciens S-2895 and S. aureofaciens ATCC 12,551*

Utilizing the method disclosed in Example 8, a mixed fermentation of S-2895, obtained as shown in Example 7, and *S. aureofaciens* ATCC 12,551 was carried out with the following results:

| Microorganisms | Chlortetracycline content by fluorometric assay, mcg./ml. |
| --- | --- |
| S-2895 at age 120 hours | 0 |
| ATCC 12,551 at age 120 hours | 60 |
| S-2895 plus ATCC 12,551 mixed at 24 hours, assayed at 120 hours | 375 |

EXAMPLE 12

*Cosynthesis of chlortetracycline in a mixed fermentation of S. aureofaciens S-2895 and S. aureofaciens ATCC 10,762*

S-2895, obtained as described in Example 8, and *S. aureofaciens* ATCC 10,762, were used in a mixed fermentation according to the procedure of Example 10. Test results are shown below:

| Microorganisms | Chlortetracycline content by bioassay, mcg./ml. |
| --- | --- |
| S-2895 at age 120 hours | <2 |
| ATCC 10,762 at age 120 hours | 24 |
| S-2895 plus ATCC 10,762 mixed at 24 hours, assayed at 120 hours | 181 |
| S-2895 plus ATCC 10,762 mixed and assayed at 120 hours | 8 |

EXAMPLE 13

*Cosynthesis of chlortetracycline in a mixed fermentation of S. aureofaciens S-2895 and S. aureofaciens V-655*

A spore suspension of *S. aureofaciens* ATCC 12,748 was plated on AP6 agar such that individual colonies could be discerned. Several colonies which appeared typical of the strain were isolated. One of these colonies gave a different appearance, on a Q4 agar slant, from the normal type; the growth being very dark, almost black. An inoculum was prepared as shown in Example 1. Fermentation, in the medium described in Example 2, resulted in a dark green colored mash containing no chlortetracycline or other antibiotic activity. When this isolate V-655 was grown in mixed fermentation with S-2895 according to the procedure given in Example 8, the following results were obtained:

| Microorganisms | Chlortetracycline content by bioassay, mcg./ml. |
| --- | --- |
| S-2895 at age 120 hours | <2 |
| V-655 at age 120 hours | <2 |
| S-2895 plus V-655 mixed at 24 hours, assayed at 120 hours | 1,160 |

EXAMPLE 14

*Cosynthesis of chlortetracycline in a mixed fermentation of S. aureofaciens ATCC 13,189 and S. aureofaciens ATCC 12,749*

A mixed fermentation of *S. aureofaciens* ATCC 13,189 and *S. aureofaciens* ATCC 12,749 was carried out according to the method given in Example 10. The 120-hour harvest mashes were tested for antibiotic potency with the following results:

| Strain No. | Chlortetracycline content by bioassay, mcg./ml. |
| --- | --- |
| ATCC 13,189 at age 120 hours | 3 |
| ATCC 12,749 at age 120 hours | 279 |
| ATCC 13,189 plus ATCC 12,749 mixed at 48 hours, assayed at 120 hours | 4,770 |
| ATCC 13,189 plus ATCC 12,749 mixed and assayed at 120 hours | 121 |

EXAMPLE 15

*Cosynthesis of chlortetracycline in a mixed fermentation of S. aureofaciens ATCC 12,749 and S. aureofaciens ATCC 13,190*

A mixed fermentation of *S. aureofaciens* ATCC 12,749 and *S. aureofaciens* ATCC 13,190 was carried out in accordance with the technique illustrated in Example 8 except that mixture was made at 48 hours rather than 24 hours and the proportion of the mixture was 92% *S. aureofaciens* ATCC 12,749 and 8% *S. aureofaciens* ATCC 13,190 instead of a 50:50 mixture. The 120-hour mature mashes were tested with the following results:

| Microorganisms | Chlortetracycline content by fluorometric assay, mcg./ml. |
| --- | --- |
| ATCC 12,749 at age 120 hours | 160 |
| ATCC 13,190 at age 120 hours | 15 |
| ATCC 12,749 plus ATCC 13,190 mixed at 48 hours, assayed at 120 hours | 4,200 |

EXAMPLE 16

*Effect of mixing cosynthetic strains at various ages*

Inocula of *Streptomyces aureofaciens* ATCC 12,748 and *S. aureofaciens* ATCC 13,190 were grown as described in Example 1. Fermentation medium was prepared as shown in Example 2. A number of 250 milliliter Erlenmeyer flasks containing 25 milliliter portions of this fermentation medium were sterilized and cooled. Half of these flasks were each inoculated with 1.0 milliliter aliquots of the *S. aureofaciens* ATCC 12,748 inoculum and the remainder with 1.0 milliliter aliquots of *S. aureofaciens* ATCC 13,190. A 50:50 mixture consisting of 12.5 milliliters of fermentation medium containing *S. aureofaciens* ATCC 12,748 and 12.5 milliliters of fermentation medium containing *S. aureofaciens* ATCC 13,190 was also prepared. All flasks containing inoculated fermentation medium were then incubated at 25° C. on a rotary shaker operating at 180 revolutions per minute. At intervals of 24, 48, 72 and 96 hours, other 50:50 two-strain combinations were made by mixing a 12.5 milliliter portion of *S. aureofaciens* ATCC 12,748 fermentation mash taken at that 24-, 48-, 72-, or 96-hour age with a 12.5 milliliter portion of *S. aureofaciens* ATCC 13,190 taken at a similar age. In the cases of flasks containing single strains, and flasks containing two-strain mixtures, the *total* incubation time, under the conditions noted above, was 120 hours. Where two-strain mixtures were involved, the 120-hour incubation period was the total of the single-strain fermentation time before mixing (24, 48, 72 and 96 hours, respectively) and the two-strain fermentation time after mixing (96, 72, 48, and 24 hours, respectively). The 120-hour harvest mashes were then tested for chlortetracycline content by means of the fluorometric assay. Test results are listed below:

| Microorganisms | Chlortetracycline content by fluorometric assay at age 120 hours, mcg./ml. |
|---|---|
| ATCC 12,748 | 110 |
| ATCC 13,190 | 10 |
| ATCC 12,748 plus ATCC 13,190 mixed at: | |
| 0 hours | 1,390 |
| 24 hours | 700 |
| 48 hours | 1,470 |
| 72 hours | 1,100 |
| 96 hours | 280 |

EXAMPLE 17

*Effect of different percentage compositions of mixtures of cosynthetic strains*

Inocula of *Streptomyces aureofaciens* ATCC 12,748 and *S. aureofaciens* ATCC 13,190 were grown as described in Example 1. Fermentation medium was prepared as shown in Example 2. A number of 250 milliliter Erlenmeyer flasks containing 25 milliliter portions of this fermentation medium were sterilized and cooled. Half of these flasks were each inoculated with 1.0 milliliter aliquots of the *S. aureofaciens* ATCC 12,748 inoclum and the remainder with 1.0 milliliter aliquots of *S. aureofaciens* ATCC 13,190 inoculum. All flasks containing inoculated medium were then incubated, at 25° C., on a rotary shaker operating at 180 revolutions per minute, for 48 hours. At the termination of the 48 hour incubation period, various amounts of the *S. aureofaciens* ATCC 12,748 fermentation mash and *S. aureofaciens* ATCC 13,190 fermentation mash were combined in such a manner as to yield 25 milliliter total volume, two-strain mixtures having varied relative proportions of the two fermentation mashes. All flasks containing single strains and all flasks containing two-strain mixtures were again incubated at 25° C. on a rotary shaker for an additional 72 hours, so that the total incubation time in all cases was 120 hours. The 120 hour harvest mashes were then tested for chlortetracycline content by means of fluorometric and bioassay (turbidimetric, with *S. aureus*) methods. Ultraviolet absorption spectra of the various two-strain mixed fermentation mashes showed peaks at 368 mμ; corresponding to chlortetracycline. Test results were as follows:

| | Chlortetracycline content by fluorometric assay at age 120 hours, mcg./ml. |
|---|---|
| *S. aureofaciens* ATCC 12,748 grown alone | 110 |
| *S. aureofaciens* ATCC 13,190 grown alone | 10 |

COMBINATIONS (GROWN AS COSYNTHETIC PAIRS)

| *S. aureofaciens* ATCC 12,748, percent | + | *S. aureofaciens* ATCC 13,190, percent | Chlortetracycline content by fluorometric assay at age 120 hours, mcg./ml. |
|---|---|---|---|
| 100 | | 0 | 110 |
| 96 | | 4 | 2,450 |
| 92 | | 8 | 2,280 |
| 84 | | 16 | 2,960 |
| 68 | | 32 | 2,180 |
| 60 | | 40 | 2,140 |
| 40 | | 60 | 820 |
| 32 | | 68 | 330 |
| 16 | | 84 | 100 |
| 8 | | 92 | 100 |
| 4 | | 96 | 20 |
| 0 | | 100 | 10 |

EXAMPLE 18

*Cosynthesis of chlortetracycline in a mixed fermentation of S. aureofaciens ATCC 12,749 and S. aureofaciens V–655*

A mixed fermentation was carried out using the method described in Example 8 and combining *S. aureofaciens* ATCC 12,749 with isolate V–655 which was obtained as illustrated in Example 13. Test results are as follows:

| Microorganisms | Chlortetracycline content by bioassay, mcg./ml. |
|---|---|
| ATCC 12,749 at age 120 hours | 463 |
| V–655 at age 120 hours | <2 |
| ATCC 12,749 plus V–655 mixed at 24 hours, assayed at 120 hours | 1,810 |

EXAMPLE 19

*Cosynthesis of chlortetracycline in a mixed fermentation of S. aureofaciens V–655 and S. aureofaciens S–2242*

V–655 was obtained as shown in Example 13. S–2242 was obtained by the method illustrated in Example 6. A mixed fermentation was carried out using the technique illustrated in Example 8 with these two isolates. Test results were as follows:

| Microorganisms | Chlortetracycline content by bioassay, mcg./ml. |
|---|---|
| V–655 at age 120 hours | <2 |
| S–2242 at age 120 hours | <2 |
| V–655 plus S–2242 mixed at 24 hours, assayed at 120 hours | 124 |

EXAMPLE 20

*Cosynthesis of chlortetracycline in a mixed fermentation of S. aureofaciens V–655 and S. aureofacients ATCC 13,192*

The cosynthesis of chlortetracycline in this example was accomplished by the mixed fermentation of V–655, obtained as shown in Example 13, and *S. aureofaciens* ATCC 13,192, following the method given in Example 8. Test results follow:

| Microorganisms | Chlortetracycline content by bioassay, mcg./ml. |
|---|---|
| V–655 at age 120 hours | <2 |
| ATCC 13,192 at age 120 hours | <2 |
| V–655 plus ATCC 13,192, mixed at 24 hours, assayed at 120 hours | 416 |

EXAMPLE 21

*Cosynthesis of tetracycline in a mixed fermentation of S. aureofaciens ATCC 13,192 and S. hyroscopicus (A-9538-1)*

A mixed fermentation of *S. aureofaciens* ATCC 13,192 and *S. hyroscopicus* was carried out using the method disclosed in Example 10. Test results are shown below:

| Microorganisms | Assay, mcg./ml. |
|---|---|
| ATCC 13,192 at age 120 hours | 0. |
| S. hygroscopicus (A-9538-1) at age 120 hours. | 640 (oxytetracycline). |
| ATCC 13,192 plus S. hygroscopicus, mixed at 24 hours, assayed at 120 hours. | 350 (oxytetracycline)+250 (tetracycline). |
| ATCC 13,192 plus S. hygroscopicus, mixed and assayed at 120 hours. | 350 (oxytetracycline). |

EXAMPLE 22

*Cosynthesis of chlortetracycline in a mixed fermentation of S. aureofaciens ATCC 12,749 and S. aureofaciens V-15*

This isolate, *S. aureofaciens* V-15 was selected from an AP4 agar plate as an orange-brown colony typical of its *S. aureofaciens* parent which in turn had been derived from a mutagenically-treated chlortetracycline producer. This isolate made red mash and contained no antibiotic activity. A mixed fermentation of V-15 with *S. aureofaciens* ATCC 12,749 in accordance with the method given in Example 8, except that mixture was performed at 48 hours rather than 24 hours, yielded the results shown below:

| Microorganisms | Chlortetracycline content | |
|---|---|---|
|  | Fluorometric assay, mcg./ml. | Bioassay, mcg./ml. |
| ATCC 12,749 at age 120 hours | 170 | 182 |
| V-15 at age 120 hours | 20 | <2 |
| ATCC 12,749 plus V-15 mixed at 48 hours, assayed at 120 hours | 2,250 | 2,738 |

EXAMPLE 23

*Cosynthesis of 7-chloro-6-demethyltetracycline in a mixed fermentation of V-15 and S. aureofaciens ATCC 13,191*

As shown in Example 22, isolate V-15 made a red mash which contained very little antibiotic activity. When *S. aureofaciens* ATCC 13,191 was grown in the fermentation medium disclosed in Example 2, it produced no tetracycline antibiotic and no antibacterial activity (*S. aureus* turbidimetric assay). In a mixed fermentation utilizing V-15 and *S. aureofaciens* ATCC 13,191 (3 milliliters V-15, 48-hour mash added to 25 milliliters *S. aureofaciens* ATCC 13,191 48-hour mash; harvested at 120 hours) the resulting mash contained about 200 mcg./ml. of 7-chloro-6-demethyltetracycline.

EXAMPLE 24

*Cosynthesis of 6-demethyltetracycline in a mixed fermentation of S. aureofaciens ATCC 13,191 and S. aureofaciens A-8291*

A soil sample was leached with sterile distilled water. This leach-water was subsequently diluted with a large volume of sterile distilled water and aliquots of this dilute solution plated on AP6 nutrient agar. The resultant colonies gave a characteristic strong and earthy odor. One colony which was pale green-yellow, translucent, with an apigmentous margin was selected and upon taxonomic inspection was shown to be *S. aureofaciens*. This culture was propagated in the usual manner and the fermentation mash was dark gray in color. This culture was designated A-8291.

Inocula of *S. aureofaciens* ATCC 13,191 and A-8291 were grown as described in Example 1. A number of flasks containing the fermentation medium disclosed in Example 2 were prepared. Half of these flasks were inoculated with *S. aureofaciens* ATCC 13,191 and half with A-8291. All of these flasks were incubated for 30 hours at 25° C. At this time, equal volumes of the two separate fermentations were combined, 10 p.p.m. of 2,5-dimercapto-1,3,4-thiadiazole (DMTD) were added to the mixture and the fermentation continued to 120 hours. Simultaneously, 10 p.p.m. of DMTD were added to the single fermentations and these fermentations were continued to 120 hours. At harvest, the following results were obtained:

| Microorganisms | 6-demethyltetracycline content by bioassay, mcg./ml. |
|---|---|
| ATCC 13,191 at age 120 hours | <5 |
| A-8291 at age 120 hours | <5 |
| ATCC 13,191 plus A-8291 mixed at 30 hours, assayed at 120 hours | 100 |

EXAMPLE 25

*Cosynthesis of bromotetracycline in a mixed fermentation of S. aureofaciens A-8291 and S. aureofaciens ATCC 12,751*

A low-halide medium was prepared as disclosed in Example 3 and 200 milligrams per liter of potassium bromide (chloride-free) was added. Separate flasks of this medium were inoculated with A-8291, obtained as described in Example 24, and with *S. aureofaciens* ATCC 12,751. At 24 hours, equal volumes were mixed and the fermentation of separate and mixed samples continued for an additional 96 hours. Tests results are shown below:

| Microorganisms | Bromotetracycline content by fluorometric assay, mcg./ml. |
|---|---|
| A-8291 at age 120 hours | <25 |
| ATCC 12,751 at age 120 hours | <5 |
| A-8291 plus ATCC 12,751 mixed at 24 hours, assayed at 120 hours | 550 |

EXAMPLE 26

*Cosynthesis of oxytetracycline in a mixed fermentation of S. aureofaciens ATCC 13,192 and S. rimosus ATCC No. 10,970 mutant O-1066*

A stock spore suspension of *S. rimosus* ATCC 10,970 was exposed to the mutagenic effect of X-rays and the exposed spores used, subsequently, to seed an AP6 nutrient agar plate. An unusual pigmented colony was selected, designated O-1066 and carried to stock spores in the usual manner. Upon mixing a 24-hour shaker flask culture of this isolate with a similar preparation of ATCC 13,192 and continuing the resulting mixed fermentation for an additional 96 hours, the mature mash showed cosynthesis of oxytetracycline by the following results:

| Microorganisms | Oxytetracycline content by bioassay mcg./ml. |
|---|---|
| ATCC 13,192 at age 120 hours | <10 |
| O-1066 at age 120 hours | <2 |
| ATCC 13,192 plus O-1066 mixed at 24 hours, assayed at 120 hours | 187 |

EXAMPLE 27

*Cosynthesis of tetracycline in a mixed fermentation of S. aureofaciens ATCC 13,192 and S. aureofaciens E–1018*

A typical specimen of E–475 shown in Example 9 was exposed to nitrogen-mustard. The treated spore suspension was used to inoculate AP6 agar plates. After inoculation, a dark glossy colony, Isolate E–1018 which differed in appearance from the remaining colonies on the plate was spread onto Q4 sporulation agar and grown until spores had formed. Fermentation in the medium shown in Example 2 resulted in a dark red-brown mash which contained no chlortetracycline and which differed from that of E–475 in paper chromatograms and in its spectrophotometric picture. A mixed fermentation of ATCC 13,192, obtained as in Example 5 and E–1018 was performed according to directions given in Example 8 and resulted in the cosynthesis of tetracycline as shown below:

| Microorganisms | Tetracycline content by spectrophotometric assay, mcg./ml. |
| --- | --- |
| ATCC 13,192 at age 120 hours | 0 |
| E–1018 at age 120 hours | 0 |
| ATCC 13,192 plus E–1018 mixed at 48 hours, assayed at 120 hours | 425 |

EXAMPLE 28

*Cosynthesis of 7-chloro-6-demethyltetracycline in a mixed fermentation of S. aureofaciens E–1018 and S. aureofaciens V–15*

E–1018 obtained as described in Example 27, was used in combination with S. aureofaciens V–15, obtained as described in Example 22, in a mixed fermentation procedure similar to that described in Example 8. The following results were obtained:

| Microorganisms | 7-chloro-6-demethyltetracycline content by spectrophotometric assay, mcg./ml. |
| --- | --- |
| E–1018 at age 120 hours | <10 |
| V–15 at age 120 hours | <5 |
| E–1018 plus V–15 mixed at 24 hours, assayed at 120 hours | 45 |

EXAMPLE 29

*Cosynthesis of chlortetracycline in a mixed fermentation of S. aureofaciens V–15 and S. aureofaciens ATCC 12,751*

Isolate V–15 was prepared in accordance with the directions given in Example 22. A mixed fermentation of this isolate and S. aureofaciens ATCC 12,751, by the method disclosed in Example 8, gave the results shown below:

| Microorganisms | Chlortetracycline content by fluorometric assay, mcg./ml. |
| --- | --- |
| V–15 at age 120 hours | 20 |
| ATCC 12,751 at age 120 hours | 190 |
| V–15 plus ATCC 12,751 mixed at 24 hours, assayed at 120 hours | 2,700 |

EXAMPLE 30

*Cosynthesis of chlortetracycline in a mixed fermentation of S. aureofaciens ATCC 12,751 and S. albus*

A mixed fermentation, performed as illustrated in Example 8, and employing S. aureofaciens ATCC 12,751 and Streptomyces albus, yielded the following results:

| Microorganisms | Chlortetracycline content by bioassay, mcg./ml. |
| --- | --- |
| ATCC 12,751 at age 120 hours | 279 |
| S. albus at age 120 hours | 0 |
| ATCC 12,751 plus S. albus mixed at 24 hours, assayed at 120 hours | 1,390 |

EXAMPLE 31

*Cosynthesis of chlortetracycline in a mixed fermentation of S. aureofaciens ATCC 12,751 and S. platensis NRRL 2364*

Using the methods illustrated in Example 10, a mixed fermentation of S. aureofaciens ATCC 12,751 combined with S. platensis NRRL 2364 was performed with results as follows:

| Microorganisms | Chlortetracycline content by bioassay, mcg./ml. |
| --- | --- |
| ATCC 12,751 at age 120 hours | 279 |
| NRRL 2364 at age 120 hours | <2 |
| ATCC 12,751 plus NRRL 2364 mixed at 24 hours, assayed at 120 hours | 234 |
| ATCC 12,751 plus NRRL 2364 mixed and assayed at 120 hours | 141 |

EXAMPLE 32

*Cosynthesis of chlortetracycline in a mixed fermentation of S. aureofaciens O–1830 and S. aureofaciens ATCC 13,192*

A suspension of stock S. aureofaciens NRRL 2209 spores was exposed to mutagenic ultraviolet radiation, then used to seed lightly an AP6 nutrient agar plate. Upon incubation, a wide variety of colony types developed; in all a total of 109 colonies. Each of the colonies was transferred to an agar slant to produce spores which, in turn, were used to inoculate fermentation medium in shaker flasks. After 24 hours incubation, the mashes, representing each original colony, were individually mixed with equal portions of a 24-hour mash of S. aureofaciens ATCC 13,192. After an additional 96 hours incubation, each mixed-fermentation was compared with the component pure-culture 120-hour fermentations. Of the isolates representing the original 109 colonies, 87 were still moderately good producers of chlortetracycline in pure culture and were discarded. Of the remaining 22 isolates, 20—comprising darker, lighter, larger, smaller, and varying colored original colonies—showed no cosynthesis with S. aureofaciens ATCC 13,192. One of the two remaining isolates, now designated O–1830 showed the following test values:

| Microorganisms | Chlortetracycline content by fluorometric assay, mcg./ml. |
| --- | --- |
| ATCC 13,192 at age 120 hours | <2 |
| O–1830 at age 120 hours | <2 |
| ATCC 13,192 plus O–1830 mixed at 24 hours, assayed at 120 hours | 1,050 |

EXAMPLE 33

*Cosynthesis of oxytetracycline in a mixed fermentation of S. aureofaciens ATCC 13,192 and S. rimosus AB115*

A strain of Streptomyces designated AB115 was isolated from a soil sample treated as described in Example 24 and identified as a strain of S. rimosus. A mixed fermentation of ATCC 13,192, and S. rimosus AB115 was performed according to the procedures described in Example 6 and resulted in the synergistic cosynthesis of oxytetracycline as shown below:

| Microorganisms | Oxytetracycline, mcg./ml. |
|---|---|
| ATCC 13,192 at age 120 hours | <9 |
| S. rimosus AB115 at age 120 hours | 2,250 |
| ATCC 13,192 plus S. rimosus AB115 mixed at 24 hours, assayed as 120 hours | 3,080 |
| ATCC 13,192 plus S. rimosus AB115 mixed and assayed at 120 hours | 1,180 |

EXAMPLE 34

*Cosynthesis of oxytetracycline in a mixed fermentation of S. rimosus AB115 and S. aureofaciens E-475*

A mixed fermentation of S. rimosus AB115 and S. aureofaciens E-475 was carried out as described in Example 6. The analytical results are shown below:

| Microorganisms | Assay, mcg./ml. |
|---|---|
| AB115 | 1,800 (oxytetracycline). |
| E-475 | 1,780 (7-chloro-6-demethyl-tetracycline). |
| AB115 plus E-475 mixed at 24 hours and assayed at 120 hours. | 3,200 (oxytetracycline). 100 (7-chloro-6-demethyl-tetracycline). |
| AB115 plus E-475 mixed and assayed at 120 hours. | 900 (oxytetracycline). 850 (7-chloro-6-demethyl-tetracycline). |

We claim:

1. A process for the cosynthetic production of a tetracycline antibiotic selected from the group consisting of tetracycline, chlortetracycline, bromtetracycline, oxytetracycline, 6-demethyltetracycline and 7-chloro-6-demethyltetracycline which comprises cultivating at least two microorganisms of the genus *Streptomyces* one strain of which is of a species capable of producing a tetracycline antibiotic of the aforesaid group and the other strain of which is a strain selected from the group consisting of *S. aureofaciens*, *S. rimosus*, *S. hygroscopicus*, *S. platensis* and *S. albus* and is capable of acting cosynthetically therewith in an aqueous nutrient medium containing assimilable sources of carbohydrate, nitrogen and inorganic salts under submerged aerobic conditions until an enhanced quantity of said antibiotic is produced.

2. A process according to claim 1 in which one of the strains of *Streptomyces* is a strain of *S. aureofaciens*.

3. A process according to claim 1 in which one of the strains of *Streptomyces* is a strain of *S. rimosus*.

4. A process according to claim 1 in which one of the strains of *Streptomyces* is a strain of *S. hygroscopicus*.

5. A process according to claim 1 in which one of the strains of *Streptomyces* is a strain of *S. platensis*.

6. A process according to claim 1 in which one of the strains of *Streptomyces* is *S. aureofaciens* and the other of the strains is *S. rimosus*.

7. A process according to claim 1 in which one of the strains of *Streptomyces* is *S. aureofaciens* and the other of the strains is *S. hygroscopicus*.

8. A process according to claim 1 in which one of the strains of *Streptomyces* is *S. aureofaciens* and the other of the strains is *S. albus*.

9. A process according to claim 1 in which one of the strains of *Streptomyces* is *S. aureofaciens* and the other of the strain is *S. platensis*.

10. A process according to claim 1 in which one of the strains of *Streptomyces* is *S. rimosus* and the other of the strains is a 7-chloro-6-demethyltetracycline-producing strain of *S. aureofaciens*.

References Cited in the file of this patent

UNITED STATES PATENTS

| 2,712,517 | Gourevitch et al. | July 5, 1955 |
| 2,739,924 | Lein et al. | Mar. 27, 1956 |
| 2,776,243 | McGhee et al. | Jan. 1, 1957 |